June 25, 1957  G. M. KRIEGBAUM ET AL  2,796,825
DEVICE FOR MAINTAINING CONSTANT WEIGHT BALES
Filed Aug. 27, 1954

INVENTORS
GEORGE M. KRIEGBAUM
JAMES H. BORNZIN
HOWARD F. BARDWELL

Paul O. Pipper
ATTORNEY

United States Patent Office 2,796,825
Patented June 25, 1957

2,796,825

DEVICE FOR MAINTAINING CONSTANT WEIGHT BALES

George M. Kriegbaum, Homewood, Ill., and James H. Bornzin and Howard F. Bardwell, Memphis, Tenn., assignors to International Harvester Company, a corporation of New Jersey Application August 27, 1954, Serial No. 452,678

4 Claims. (Cl. 100—43)

This invention relates to a new and improved device for maintaining bales at a constant weight.

The use of hay balers is becoming more and more prevalent throughout our country. In lieu of storing hay loosely in a mow such as was previously done the farmer now bales his hay into a compressed form and stores it in just a fraction of the space required for loose hay. The existence of varying conditions at the time of baling creates the problem of obtaining bales of varying weights and densities. Many devices and contrivances of all kinds have been employed in order to make more uniform size and weight bales. Certain of these devices employ the density of the hay in the formed bale as a criterion for the uniformity of the bale. However, the present device varies from these prior mechanisms in that it employs a direct weighing mechanism for automatically controlling the weight of succeeding bales being formed.

It is therefore a principal object of this invention to provide means for weighing completed bales and in response to the weight of any individual bale to directly vary the size of the discharge opening of the bale-forming chamber to thereupon directly control the weight of succeeding bales.

An important object of this invention is the provision of a weighing platform immediately following the discharge of the bales from a bale-forming chamber and means operable in response to fluctuations in the level of the weighing platform to control the size of the discharge opening of the bale-forming chamber.

Another and further important object of this invention is to supply the hay baler with means for making substantially uniform weight bales therein.

A still further important object of this invention is to equip a hay baler with hydraulic means operable in response to the weight of bales being discharged for controlling the size of the discharge opening of the bale-forming chamber and thereupon directly control the weight of bales formed thereafter.

Another and still further important object of this invention is to provide a hay baler with a weighing platform in combination with a means for delivering hydraulic fluid under pressure to a means for restricting the size of the bale chamber discharge opening and providing for the by-passing of this fluid under pressure from the means for constricting the bale chamber discharge opening in response to the weighing platform being depressed some amount in excess of the desired depression of the platform due to the weight of the bale thereon.

Other and further important objects and advantages will become apparent from the disclosures in the following specification and accompanying drawing:

Figure 1:
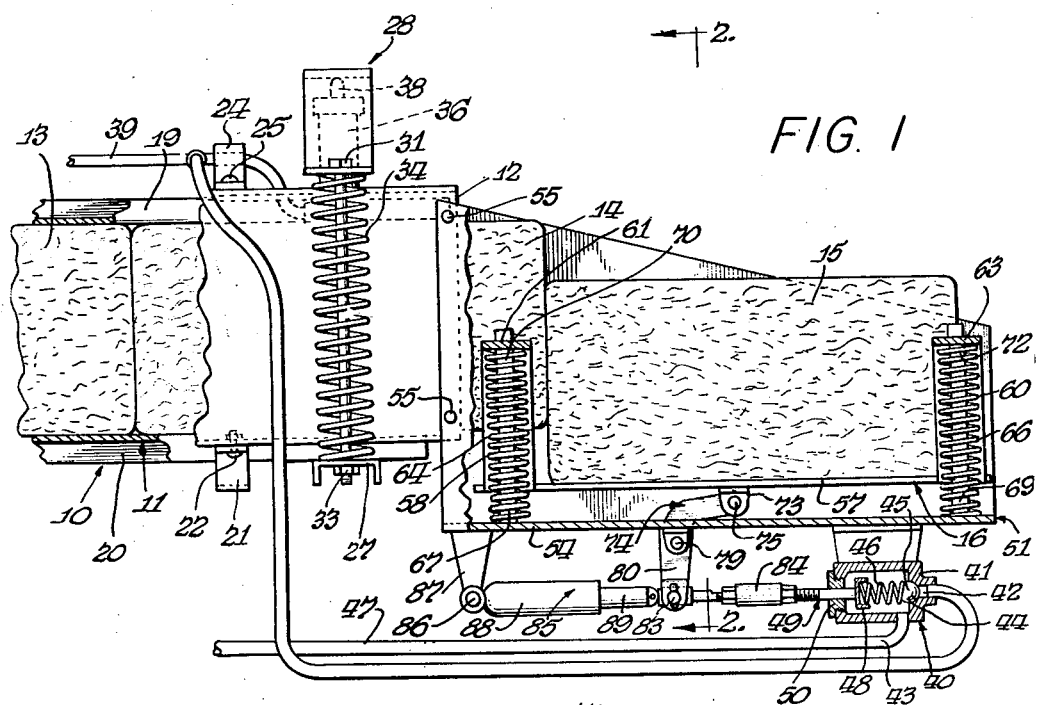
Figure 1 is a side elevational view partially in section of the discharge end of a bale-forming chamber and including the weighing platform of this invention thereon.

As shown in the drawings the reference numeral 10 indicates generally a frame supporting structure for the hay baler of this invention. This frame supporting structure 10 includes a bale-forming chamber 11 which is generally rectangular in cross section. The bale-forming chamber is shown in Figure 1 as having a discharge opening 12 for bales or the like which are formed within the bale-forming chamber. These bales are indicated at 13, 14 and 15. The formed bale 15 has been discharged from the bale-forming chamber 11 through the opening 12 and has been deposited upon a weighing platform 16 which constitutes a major portion of the present invention.

Figure 2:
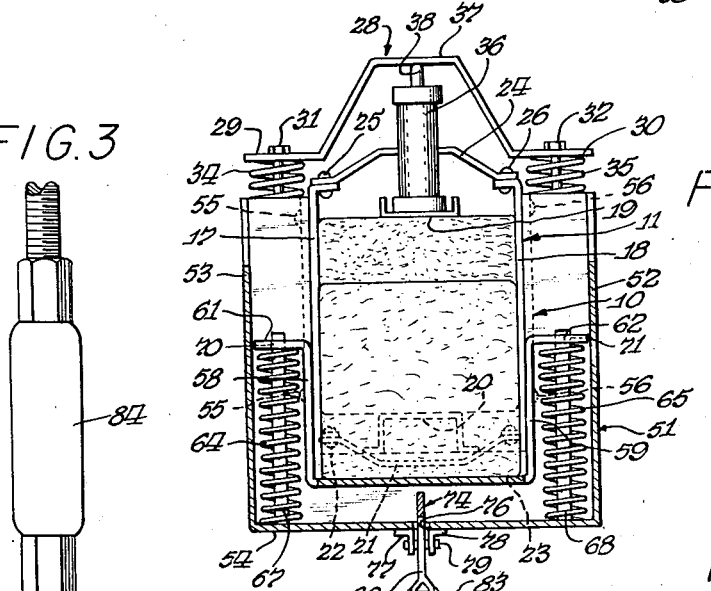
Figure 2 is a sectional view of the device taken on the line 2—2 of Figure 1.

As best shown in Figure 2 the bale-forming chamber 11 is provided with parallel sides 17 and 18 which are generally spaced apart and disposed vertically. The chamber 11 also is provided with top and bottom channel members 19 and 20. The channel member 20 is held in a downward limiting position relative to the bottom of the chamber 11 by means of a strap member 21 being bolted respectively at 22 and 23 to the vertical sides 17 and 18 at their bottoms. A similar tie strap or connecting member 24 is provided across and joins the tops of the sides 17 and 18. The tie strap is connected by rivets 25 and 26 or the like to the sides 17 and 18. The purpose of the strap members 21 and 24 are to hold the bale chamber sides in fixed position relative to each other.

The channel member 27 is extended across the bottom of the bale-forming chamber and projects laterally beyond each side thereof. A tent-shaped member 28 spans the upper surface of the bale-forming chamber in alignment with the channel 27 and the side extensions thereof 29 and 30 are directly above the laterally extending ends of the channel 27. Elongated bolt members 31 and 32 join the tent-shaped strap member 28 with the channel 27. The elongated bolts 31 and 32 are provided with nuts 33 at the bottom thereof beneath the channel member 27. Helical coil springs 34 and 35 are positioned between the ends 29 and 30 of the tent-shaped strap member and the laterally extending ends of the channel member 27. The springs 34 and 35 normally urge the separation of the members 27 and 28 although these members will normally separate when hay enters the bale chamber.

As best shown in Figure 2 a hydraulic cylinder 36 is disposed between the channel member 19 which forms the upper surface of the bale-forming chamber 10 and the top cross piece 37 of the tent-shaped tie member 28. The hydraulic cylinder has a reciprocable piston 38 which moves vertically and reacts against this top cross member 37. Thus when the piston 38 is extended from the cylinder 36 the top channel or pressure plate member 19 of the bale-forming chamber will be urged downwardly and the bottom channel or pressure plate member will be urged upwardly thus further compressing the hay being moved through this bale-forming chamber.

Fluid under pressure, supplied by a source not shown, is delivered through a conduit 39 which is simultaneously directed to the hydraulic cylinder 36 and to a relief valve 40 located at the bottom of the weighing platform 16. The relief valve 40 is the means of controlling the amount of fluid under pressure which is admitted to the hydraulic cylinder 36. This directly controls the size of the discharge opening of the bale-forming chamber. The variable control for the valve 40 is actuated by the weighing platform at the rearward portion of the baling machine.

The relief valve 40 comprises a housing 41 having an inlet opening 42 and a discharge or outlet opening 43. A ball valve seat 44 is provided on the inner surface of the inlet opening 42 and is adapted to receive a ball 45 there-against. The ball 45 is urged against its cooperative valve seat 44 by means of a spring 46 which by means to be described is capable of having its tension varied. The valve 40 is in the nature of a relief valve and permits an escape of fluid under pressure from the hydraulic cylinder 36 at a time when there is no need to further contract the discharge opening of the bale-forming chamber. For example, when the bales are relatively light and fluffy it is desirable that the discharge opening of the bale-forming chamber be contracted in order to tighten the succeeding bales and at this point the valve ball 45 is urged very strongly against its seat 44 thus closing the inlet of the valve against the admission of fluid under pressure through the conduit 39. In this position all of the fluid under pressure is directed to the hydraulic cylinder 36 whereupon the discharge opening of the baleforming chamber is contracted which results in tighter and consequently heavier bales being formed. However, conversely when the bales are heavier than desired by previous setting the ball 45 is not urged by spring 46 with any great force against its seat thus permitting relief of the fluid under pressure to pass through the inlet 42 of the valve 40 and thence out the outlet 43 whereupon the fluid under pressure may pass through the conduit 47 back to a reservoir.

The end of the spring 46 opposite its engagement with the ball 45 is carried in a cup-shaped member 48 which is formed as the end of a shaft or rod 49. The shaft 49 is generally mounted in a bushing 50 which is threadedly engaged into the housing 41 of the valve 40. It will thus be apparent that the lateral extension or retraction of the shaft 49 will effect various positions of the end of the spring 44 and thus the tension in the relief valve spring 46 may be varied as desired to simultaneously vary the ease by which the fluid under pressure may be by-passed through this valve 40.

A U-shaped trough member 51 is fixedly mounted on the end of the bale-forming chamber 10 and forms an integral part thereof. The weighing scale which has previously been talked of in only general terms is disposed on this U-shaped trough or channel member 51. As best shown in the Figure 2 the member 51 has sides 52 and 53 within a joining bottom 54. The sides 52 and 53 are securely bolted to the bale-forming chamber 10 at 55 and 56. It is thus apparent that the U-shaped member 51 is fixed relative to the bale-forming chamber 11 and further that the bale weighing scale 16 is supported on and guided within this U-shaped member.

The weighing scale 16 in addition to including a balereceiving platform 57 has at each of its four corners an upwardly extending strap member which at its upper end is bent laterally outwardly. As best shown in Figure 2 the upstanding strap members are identified as 58 and 59 which are adjacent the discharge opening of the baleforming chamber. In Figure 1 there is also shown the outer upstanding straps 60. Each of these upstanding straps is provided with its outwardly extending ledge 61, 62 and 63. Bale counter-balancing springs 64, 65 and 66 are disposed vertically between the ledges 61, 62 and 63 and the bottom 54 of the U-shaped member 51. It should be understood there are four such bale counter-balancing springs and that the spring on the far corner which is not shown is a duplicate of the spring 66. In order to maintain the springs in vertical position and properly disposed between the base 54 of the stationary U-shaped member 51 and the small ledges 61, 62 and 63 there is provided vertically disposed guide rods projecting upwardly from the base 54 as shown at 67, 68 and 69. These guide rods extend upwardly and pass loosely through openings 70, 71 and 72 in the outwardly extending flanges 61, 62 and 63 respectively. It will thus be apparent that as the bales, such as the bale 15, are deposited on the platform 57 the counter-balancing springs will be urged toward compression if the bale exceeds some predetermined weight necessary to cause compression of the counterbalancing springs.

A bracket 73 is fixedly attached to the underside of the platform 57 of the weighing scale 16. A link 74 is hingedly attached at 75 to the depending bracket 73. The link 74 proceeds forwardly toward the bale-forming chamber and thence downwardly through an opening 76 in the bottom 54 of the U-shaped member 51. Brackets 77 and 78 are attached to the underside of the bottom 54 of the U-shaped member 51 flanking the opening 76 through which the curved link 74 passes. A hinge pin 79 passes through the aligned spaced-apart brackets 77 and 78 and the intermediately disposed link 74. The downwardly depending portion of the link 74 is further identified as numeral 80 and it will be apparent that as the weighting platform 57 moves vertically with respect to the stationary bottom 54 of the U-shaped member 51 there will be a swinging movement of the lower portion 80 of the link 74 around the hinge pin 79. The link 74 terminates at its lower end adjacent the portion 80 in a fork 81 which is adapted to be linked to a block member 82 which is hinged on a cross pin 83. The outer end of the shaft 49 is adapted to move with the block 82. Thus as there is arcuate swinging movement of the lower end 80 of the link 74 there is a concurrent inward and outward shifting of the shaft 49 and thus a comparable compressing and/or loosening of the relief spring 46. The shaft 49 is provided with an adjusting mechanism 84 which is in the nature of a turnbuckle to shorten or lengthen the shaft 49 as desired. In other words the length of the shaft 49 may be adjusted to be commensurate with the level of the weighing platform 57 to constitute some predetermined compression of the relief spring 46 and thereupon maintain relatively uniform the discharge opening of the bale-forming chamber at a time when the discharged bale approximates the desired weight. This in effect is an auxiliary means of varying the compression of spring 46. The turnbuckle adjusting member 84 is in the nature of a means to calibrate the weighing scale with the relief valve 40 to thus provide for the uniform production of hay bales.

In order to minimize the swinging movement of the link 80 about the hinge 79 whenever the discharged bale falls upon the weighing platform 57 or during movement of the hay baler over rough terrain there is provided a shock absorber or stabilizer 85. The shock absorber is mounted at one end 86 on a bracket 87 depending from the underside of the bottom 54 of the U-shaped member 51. The shock absorber or stabilizer is a hydraulic cushioning element or unit in which there is provided a cylinder portion 88 and a piston 89. In the present instance the piston 89 is fastened to arm 74 at end 80 by a clevis through which pin 83 passes. The shock absorber or stabilizer 85 is one in which there is an entrapped fluid in the cylinder and means in the piston permitting by-passing of the fluid from one end of the cylinder to the other such as by restricted orifices in order to cushion the load imposed thereon and prevent undue movements which would or might be occasioned in the shaft 49 if there were not some means of limiting movement thereof only to material deflections of the weighing platform 47.

In the operation of the device of this invention the hay baler traverses a field of hay and with conventional means, not shown, picks up the hay and compresses it into bale form whereupon the individual bales are tied and discharged outwardly through an open end of the baleforming chamber 11. In the present invention and in most baling machines there is means provided for regulating the size of the discharge opening of this baleforming chamber. When the opening is contracted or made smaller there is more back pressure provided on the bales being subsequently formed thus making for more dense, heavier, and compact bales. Whereas conversely if the discharge opening is made larger the subsequent bales are thus made looser resulting in lighter weight bales. As stated in the objects above it is a principal object of this invention to minimize the variation in the weight of bales formed in a baling machine. This is accomplished by the weighing scale 16 provided just rearwardly of the discharge opening of the bale-forming chamber. An extension which is fixed with respect to the bale-forming chamber in the form of a U-shaped member 51 provides the means of support for the weighing scale and the means against which the weighing scale operates. The weighing scale is carried on the fixed member 51 by a plurality of counter-balancing springs 64, 65 and 66. When a bale such as the bale 15 is deposited upon the scale platform 57 of the weighing scale 16 it is in effect weighed and the result thereof caused to vary the compression of the relief spring 46 within the relief valve 40. For example let us suppose the weight of the bale 15 exceeds the forces in the counter-balancing springs. This of course causes the platform 57 to be moved downwardly thus causing a swinging of the depending arm 80 of the link 74 in a clockwise direction about the hinge pin 79 as viewed in Figure 1. This of course means that there is a relaxing of the tension of the spring 46 and thus also a relaxing or reducing of the amount of force which causes the seating of the ball valve 45 on the valve seat 44. Simultaneously with this relaxing of the force closing the valve 40 the fluid under pressure is permitted to crack the ball 45 from its seat 44 easier and thus permit a by-passing of the fluid under pressure from the source 39 backwardly to a reservoir or the like through the conduit 47. Conversely when the bale is relatively light the platform 57 remains in an up position whereupon the lower extension 80 of the link 74 either remains in a position as shown in Figure 1 or moves in a counterclockwise swinging movement as viewed in Figure 1 to effect a tightening of the spring 46 and a greater urging of the force closing the ball valve 45 against the seat 44. This substantially closes or bars the fluid under pressure from passing through the relief valve 40 whereupon all or most of the fluid under pressure passes to the hydraulic cylinder 36 causing an extension of its piston 38 and an inward movement of pressure plates 19 and 20 to cause a contracting of the discharge opening of the bale-forming chamber 11. It will be apparent that herein is provided a baling machine in which there is a means for minimizing the variation in the weight of the bales as they are made. The weighing scale positioned at the rearward end of the bale-forming chamber and receiving the last bale to be discharged from the bale-forming chamber continuously causes or tends to equalize the weight of succeeding bales to some predetermined weight of bale, all of which is determined by reason of the strength of the counter-balancing springs employed on the weighing platform and the spring force on ball 45 in relief valve 40.

Figure 3:
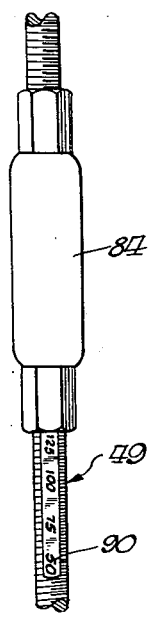
Figure 3 is a fragmentary view of a modified portion of the device of Figures 1 and 2.

A modification of the turnbuckle device is shown in Figure 3 wherein the shaft 49 is provided with a graduated calibrated scale 90. The weight of the bales may thus be prefixed by adjusting the turnbuckle 84 to some predetermined position on the shaft 49. It is thus conceivable that the present device may not only produce bales of uniform weight, but by this extra calibrated scale 90 may produce uniform bales of any desired weight.

Numerous details of construction may be varied throughout a wide range without departing from the principles disclosed herein, and we, therefore, do not propose limiting the patent granted hereon otherwise than as necessitated by the appended claims.

What is claimed is:

1. A baler comprising a bale-forming chamber, said bale-forming chamber having a bale-discharge opening, means for varying the size of said bale-discharge opening, a control mechanism for operating the means varying the size of the bale-discharge opening, and said control mechanism including a weighing scale, said weighing scale comprising a support attached to and positioned adjacent to the bale-discharge opening of said bale-forming chamber, a scale platform, spring means disposed between said scale platform and said support, and said control mechanism further including means responsive to relative movement between the scale platform and the support to actuate the means for varying the size of the bale-discharge opening, said means for varying the size of the bale-discharge opening including a pressure plate engaging one side of a bale being formed in said bale-forming chamber, a hydraulic cylinder and piston arranged and constructed to urge said pressure plate against said bale, a source of fluid under pressure, conduit means delivering fluid under pressure from said source to said hydraulic cylinder, a relief valve, a spring urging said relief valve to closed position, means regulating the degree of tension in said relief valve spring, and said last named means automatically controlled by relative movement between the scale platform and the support, and said relief valve positioned in said conduit means whereby fluid under pressure may by-pass said hydraulic cylinder by passing said relief valve.

2. A device as set forth in claim 1 in which means is provided for stabilizing movement of said scale platform.

3. A device as set forth in claim 1 in which there is included auxiliary means for varying the compression of said spring urging the relief valve to closed position.

4. A device as set forth in claim 3 in which a calibrated scale is associated with said auxiliary means whereby the weights of bales may be preselected.

References Cited in the file of this patent

UNITED STATES PATENTS

| 406,455 | Maurer | July 9, 1889 |
| 437,524 | Smith | Sept. 30, 1890 |
| 795,557 | Smith | July 25, 1905 |
| 2,576,784 | Dodds et al. | Nov. 27, 1951 |
| 2,676,532 | Hill | Apr. 27, 1954 |
| 2,724,324 | Clarke | Nov. 22, 1955 |